June 24, 1969
R. H. HAY
3,451,085
VEHICLE WASH SYSTEMS
Filed May 8, 1967
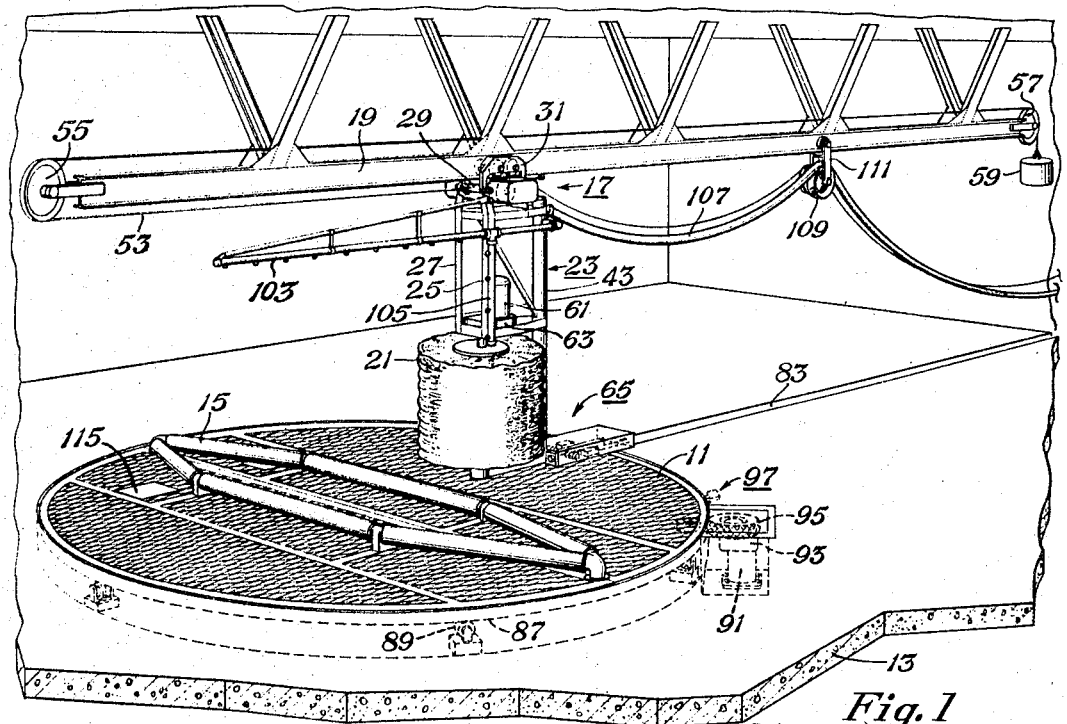
Fig. 1
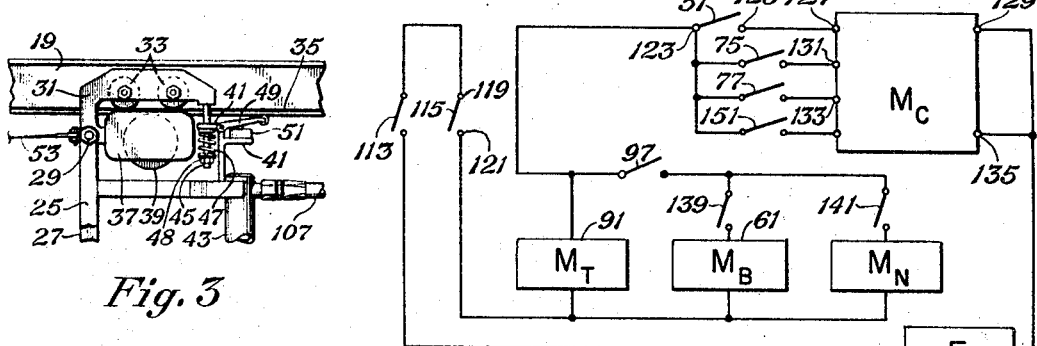
Fig. 3
Fig. 5
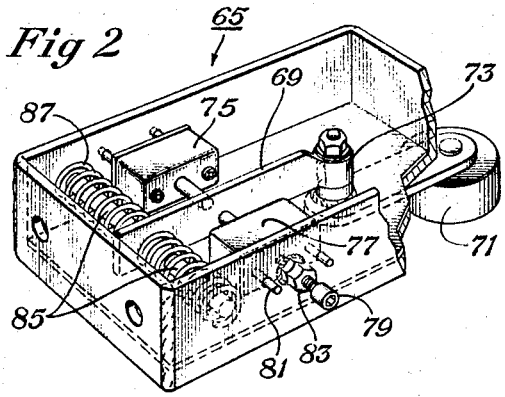
Fig. 2
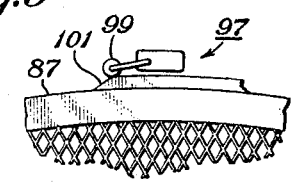
Fig. 4
INVENTOR.
Robert H. Hay
BY
Wofford & Felsman
ATTORNEYS

3,451,085
VEHICLE WASH SYSTEMS
Robert H. Hay, Rte. 1, Box 609, Irving, Tex. 75060
Filed May 8, 1967, Ser. No. 636,899
Int. Cl. A46b *13/02;* B60s *3/00*
U.S. Cl. 15—21  10 Claims

ABSTRACT OF THE DISCLOSURE

Following is disclosed a vehicle wash system in which a vehicle is positioned radially across a turntable. During rotation of the turntable, a reciprocal brush moves into engagement with the vehicle to cleanse its side and end surfaces. A weight secured to a cable supported by pulleys and thereby connected to the front of an overhead carriage to which the brush is supported urges the brush against the vehicle with a selected force. To minimize possible damage from excessive force between vehicle and brush, a sensing element communicates with the brush to energize a motor supported in the overhead carriage to retract the brush from the vehicle when the force between brush and vehicle exceeds a selected value. The sensing element disclosed has a pivotable arm that communicates on either of its sides with electrical switches, either of which may close a circuit to energize the motor. Once the forces diminish below the selected value, the sensing arm returns to a central position, opening the circuit to stop the motor. One end of the arm extends into a groove located beneath the brush, and is rotated slightly by the groove if the brush moves laterally relative to the groove. To advance the brush forward from an inactive or "stored" position toward an active or "wash" position, the electric motor in the overhead carriage is rotated in a reversed direction from that described above. When the brush engages the vehicle the brush swings slightly rearward and actuates a switch which opens the circuit to de-energize the motor and stop forward movement of the brush. The brush remains in this position until signaled to move forward or backward in response to sensed change in brush angular orientation, which is a function of the force between brush and vehicle.

Background of the invention

Commercially successful vehicle wash systems with which I am familiar may be broadly divided into two classes: (1) Those in which the vehicle moves forward through spray nozzles and simultaneously may be engaged by rotating brushes; (2) those in which forward movement of the vehicle is periodically interrupted to enable a brush or spray bar to move around the periphery of the vehicle. Such systems have a number of significant disadvantages. In both, for example, relatively large spaces are occupied by the installations since the vehicles move into the usually lengthy wash area from one direction, travel through the wash area, and move outward from the wash area travelling in the same direction. In those systems in which multiple cleaning brushes are located along the path of vehicle travel, the end surfaces of the automobile are untouched by the brushes. In those systems in which a spray bar or equivalent moves around the periphery of the automobile, it is difficult to accommodate the various vehicle sizes.

Broad description of the invention

In my system the vehicle is disposed on a vehicle support and movement means, preferably a turntable while a reciprocal brush moves forward and backward during vehicle movement to cleanse both the end and side surfaces of the vehicle. The reactive forces between brush and vehicle may be maintained below a selected value by a biasing means communicating with the brush mounting means. Additional biasing means (preferably an electric motor) is provided in one embodiment to facilitate rearward brush movement relative to the automobile when the forces on the brush exceed the selected value. Moreover, the electric motor may be utilized to rapidly move the brush from an inactive "nonwash" position to an active "wash" position adjacent the automobile. Additional features of the system will become apparent in the detailed description.

Brief description of the drawing

FIG. 1 is a perspective view of a vehicle wash system embodying principles of my invention; FIG. 2 is a fragmentary perspective view of a sensing element of the type used in connection with the system show in FIG. 1; FIG. 3 is a fragmentary side elevational view of a portion of the overhead brush carriage shown in FIG. 1; FIG. 4 is a fragmentary plan view of a preferred switch control system used to control selected components of the system; and FIG. 5 is a schematic block diagram of a circuit which may be used to facilitate control over the system.

Description of a preferred embodiment

The numeral 11 in the drawing designates a vehicle support and movement means, here a turntable, disposed in this instance in a depression in a concrete foundation 13. The turntable has guide rails 15 to direct an automobile toward a radial position across the turntable. A reciprocable carriage 17 is mounted in this instance on an overhead I-beam 19 which extends over the turntable. It is not essential that the I-beam extend completely across the turntable since rotatable brush 21 supported by the I-beam travels only partially across the turntable. The brush 21 is supported on carriage 17 by supporting frame 23.

With reference to FIG. 3, the forward arms 25, 27 of the frame are pivotally secured at 29 to a carriage or truck 31 (see especially FIG. 3) having a plurality of wheels 33 that engage the upper surface of the lower flange 35 of I-beam 19. An electric motor-gear reduction unit 37 is also rigidly secured to the truck 31 to rotate when energized a drive wheel 39 that engages the lower surface of the lower flange of I-beam 19. A protrusion 41 extends from a rear arm 43 that extends vertically behind the brush as shown in FIG. 1. A supporting finger 45 extends through an aperture (not shown) in the protrusion 41 and receives a compression spring 47. The position of a fastener 48 on finger 45 and thus the static axial force on compression spring 47 is adjustable such that the normal angular orientation of the arms 25, 27 and 43 may be varied.

A follower arm 49 extends upward from protrusion 41 to engage the lower surface of the I-beam to actuate a switch 51 carried by the protrusion 41 beneath the follower arm. When the arms 25, 27 and 43 move rearward on a pivotal mounting 29 a selected degree, the switch 51 is actuated by follower arm 49 to open the motor circuit. Thereafter, forward movement of the brush is effected only by the force applied to a flexible line, preferably a cable, 53 which extends around a pulley 55 at the end of the I-beam in front of the brush, rearward and over a pulley 57 at the opposite end of the I-beam and to a weight 59. The force applied to the vehicle by the brush is controlled by varying the size of weight 59.

Supported by the arms 25, 27 and 43 depending from the reciprocable carriage 17 is an electric motor 61 and gear reduction unit 63 which rotate the brush about a substantially vertical axis. Extending rearward from the brush and being preferably supported from the lower region of the rear arm 43 is a sensing element 65. A preferred embodiment of this sensing element is illustrated in FIG. 2, which shows a housing 67 supporting a pivotable arm 69. One portion of the arm extends through the bottom of the housing to support a roller 71, while the other end extends from the pivotal mounting 73 into the housing and between two electrical switches 75, 77. The position of the switches relative to the center of the housing 67 may be varied by rotation of the Allen head set screws 79. Dow pins 81 extend into apertures in the housing to position the switches, and a jam nut 83 is provided around the exterior of each set screw to prevent accidental rotation and variation from the selected switch position.

The roller 71 depends into an elongated slot 83 formed in the concrete 13 (see FIG. 1). Lateral movement of the brush 21 and supporting frame 23 on the carriage 17 in a direction transverse to the I-beam 19 and elongated floor slot 83 rotates the pivotable arm 69 in a direction to eventually actuate switch 75 or 77. This closes a circuit to energize the electric motor-gear reduction unit 37 in a direction to move the brush rearward from the turntable.

To prevent damage to the switches 75, 77 stationary posts 85 extend laterally from the sides of the housing 67 and preferably have compression springs 87 therearound that cooperatively urge the arms 69 toward the central disposition shown in FIG. 2.

Referring again to FIG. 1, the turntable 11 is preferably covered with heavy gauge wire mesh to enable passage of water therethrough toward a drain (not shown). The turntable has a rigid peripheral rail 87 supported by a plurality of rollers 89 in the concrete foundation 13. Rotation of the turntable is effected by an electric motor 91 and gear reduction unit 93 which drives a rubber wheel 95 engaging the side surface of the rail 87.

The wash water, rinse water and brush cycles of the apparatus may be controlled by switch means 97 disposed alongside the rail 87 of the turntable. This switch means may have a follower 99 (see FIG. 4) which engages a protrusion 101 extending from the rail 87 to open or close an electric circuit.

A horizontal spray bar 103 protrudes from the reciprocal carriage 17 to extend over the top of the vehicle, and a vertical spray bar 105 extends vertically alongside the supporting frame 23 to discharge water or a cleaning solution onto the side of the vehicle. Both spray bars are connected with the interior of the rear arm 43 which is hollow and communicates by means of a flexible conduit 107 with a fluid pressurization source (not shown). To establish a noninterfering position of the flexible conduit during operation, it is preferably partially carried by a pulley 109 disposed on a trolley 110 secured to the I-beam.

A schematic block diagram of a control circuit for the apparatus described above is shown in FIG. 5. This diagram is depicted for use with direct current electrical energy but with slight modification within the skill of the art may be adapted for hydraulic or pneumatic operation, or use with alternating current. A master switch 113, which may be coin operated, has one terminal connected with an energy source 117 and the other terminal connected with the input terminal 119 of a wheel operated switch 115 (see also FIG. 1). The output terminal 121 of switch 115 is connected with the input terminal 123 of the switch 151 actuated by the follower arm 49 on the reciprocal carriage 17. The output terminal 125 of switch 51 is connected with an input terminal 127 of electric motor $M_C$ of the electric motor-gear reduction unit 37 seen in FIGS. 1 and 3. One output terminal 129 of motor $M_C$ is connected with the energy source 117. The motor $M_C$ reversing switches 75, 77 (see also FIG. 2) are connected with the input terminal 123 of the switch 51 and respectively to terminals 131, 133 of the motor $M_C$ which communicates with output terminal 135 through a reversing circuit (not shown) within the motor $M_C$ to reverse its direction of rotation. A nozzle motor $M_N$ drives a fluid pump (not shown) to force fluid under pressure from the nozzles of spray bars 103, 105. The nozzle motor $M_N$, the brush motor $M_B$ (numeral 61 in FIG. 1), and the turntable motor $M_T$ (numeral 91 in FIG. 1) are connected in parallel from the output terminal 121 of switch 115 and the input terminal 123 of switch 51.

Switch 97, operable by the movements of the turntable as shown in FIG. 1, is interposed in the conductor between turntable motor $M_T$, and brush motor $M_B$ and nozzle motor $M_N$. Separate switches 139, 141 may be associated respectively with the motors $M_B$ and $M_N$ to enable sequential operation in response to signals from a timer on or in response to rotational movement of the turntable a selected degree. Another reversing switch 151 actuated by the turntable energizes motor $M_C$ to move the brush to an inactive position when washing and rinsing is complete.

In operation, a coin may be dropped in a meter (not shown) to closed switch 113. Then the vehicle is driven over the turntable, being guided by the rails 15 until the switch 115 is depressed. The switch 51 on the rear of the reciprocal carriage 117 is normally in the closed position. Thus, carriage motor $M_C$ rotates drive wheel 39 in the clockwise direction as viewed in FIG. 3 to urge the carriage forward until the brush 21 engages the side of the vehicle. Eventually the brush and its supporting means pivot rearward about pivot pin 29 (see FIG. 3) in response to the force between brush and vehicle until the follower arm 49 is depressed downward a degree sufficient to open the switch 51. Forward movement of the carriage and brush responsive to electric motor $M_C$ thereupon ceases. However, the brush is urged forward in response to the force applied by weight 59.

As the turntable rotates, one end of the vehicle swings toward the brush 21 and eventually causes the brush to become skewed slightly relative to vertical. This moves the housing 67 of sensing element 65 relative to the slot 83 in the floor, causing the pivotable arm 67 to rotate relative to the housing until it eventually closes either switch 75 or 77. This energizes a reversing circuit in the motor $M_C$, causing the drive wheel 39 to rotate in a counterclockwise direction as viewed in FIG. 3, to urge the carriage 17 and brush 21 away from the vehicle. When the brush has moved rearward sufficiently it once again assumes a vertical position and the pivotable arm 69 returns to its central position shown in FIG. 2. Consequently, both switch 75 and 77 are opened, de-energizing the motor and stopping rotation of drive wheel 39. Thus the cooperative action sensing element 65, the follower arm 49, along with its associated switch 51, and the forward motion and force applied by the weight 59 maintain force between the brush and the automobile below a selected minimum.

During rotation of the turntable, the follower 99 (see FIG. 4) eventually engages protrusion 101 on the rail 87 of the turntable to close the switch 97, thereby enabling energization of brush motor $M_B$ and nozzle motor $M_N$, thereby causing rotation of the brush and the deposit of washing solution upon the automobile. As previously stated, separate switches 139, 141 may be provided for the brush motor $M_B$ so that they may be operated independently.

Upon completion of the washing of all sides of the vehicle, the energy supplied to turntable motor $M_T$ is ceased by opening either a timed switch 113 or a control switch similar to switch 97 illustrated in the drawing. The carriage and brush may then be retracted to an inactive position by actuating of a reversing switch 151 also actuated by a protrusion and follower similar to those shown in FIG. 4. Then the vehicle may be removed from the turntable.

It should be apparent from the foregoing that I have provided an invention having significant advantages. The combination of a reciprocal brush and a turntable on which a vehicle is centrally disposed enables both the side and end surfaces of the vehicle to be effectively, conveniently, and quickly cleansed. This system cleanses essentially any size vehicle since there is no difficulty in provides brush reciprocation over a wide range of distances to accommodate the various vehicle lengths. The illustrated reciprocal mounting means for the brush enables effective control of force between vehicle and brush. Moreover, the use of the weight and cable arrangement enables accurate force control irrespective of brush position on the supporting structure since the biasing force does not vary with distance. Thus, force variations which occur when utilizing spring biasing means over large distances are avoided, although it is within the broad scope of my invention to utilize spring biasing means as well as brush mounting systems other than the overhead arrangement shown, including the use of brushes mounted pivotally for movement in a horizontal plane.

The various components illustrated and described in the system may vary, including the vehicle support and movement means, which may not be a turntable. The sensing element illustrated in FIG. 2, while being especially advantageous in this instance, can be replaced with other force or motion variation sensing devices. In instances where a light-weight brush and mounting means is utilized, it is not essential that a power source such as an electric motor be utilized to assist reciprocation of the carriage and brush. The reactive forces between brush and vehicle drive the brush backward periodically during vehicle rotation in such situations and the biasing means such as the weight and cable arrangement drives it forward to seek the vehicle. No damage to the brush or carriage means results if weight and friction are reduced sufficiently to prevent excessive resistance to variations in brush and carriage positions. In addition, the controls and components for the system may be hydraulic, pneumatic, or electrical as previously stated.

Therefore, it should be apparent that while I have shown my invention in only one of its forms in the drawing it is not so limited but is susceptible to various changes and modifications without departing from the spirit thereof.

I claim:
1. A vehicle wash system comprising:
  a horizontal turntable having a width sufficient to accommodate a vehicle across its diameter;
  a brush powered for rotation about an axis transverse to the plane of the turntable;
  a reciprocal carriage to which said brush is mounted;
  suspension and guide means transversely oriented relative to said turntable for supporting said carriage; and
  biasing means communicating with said carriage for urging said brush toward the turntable while enabling movement away from the turntable when the force between brush and vehicle exceeds a selected amount.

2. The system defined by claim 1 in which said suspension and guide means comprises an overhead track to which said carriage is reciprocally mounted.

3. The system defined by claim 2 wherein said biasing means comprises a weight secured to a flexible line extending to the portion of the carriage facing said turntable to urge the carriage forward against a vehicle with a force determined by the size of the weight.

4. The system defined by claim 2 wherein a motor drive means is carried by said carriage; sensing means communicating with the brush determines variations in the angular orientation of said brush responsive to varying reactive forces between brush and vehicle; and conductors and a power source communicate between said motor drive means and said carriage to energize said motor drive means responsive to said sensed variations.

5. The system defined by claim 4 wherein said sensing means comprises a pivotable arm carried by the supporting structure for said brush; and switches disposed on respective sides of said arm for actuation thereby, with one end of said arm being a follower that engages a surface extending along the path of reciprocal travel of said brush.

6. A car wash system comprising:
  a horizontal turntable having a width sufficient to accommodate a vehicle across its diameter;
  a brush powered for rotation about an axis transverse to the turntable;
  a reciprocal carriage to which said brush is mounted;
  first biasing means communicating with said carriage and brush for urging said brush toward the turntable; and
  a sensing element communicating with said carriage and brush to sense transverse forces applied to said brush; and
  second biasing means actuated responsive to said sensing element to urge said brush away from said turntable when the transverse force applied to said brush exceeds a selected value.

7. The system defined by claim 6 wherein said first biasing means comprises a weight secured to a cable extending to the portion of the carriage facing said turntable to urge the carriage forward against a vehicle with a force determined by the size of the weight.

8. The system defined by claim 1 wherein said second biasing means comprises a motor carried by said carriage; said motor being actuated by sensed variations in the orientation of said brush to drive said carriage in one direction or the other responsive to signals from said sensing element.

9. The system defined by claim 8 wherein said sensing means comprises a pivotable arm carried by the supporting structure for said brush; and switches disposed on respective sides of said arm for actuation thereby, with one end of said arm being a follower that engages a surface extending along the path of reciprocal travel of said brush.

10. A vehicle wash system comprising:
  a vehicle support and movement means;
  a brush powered for rotation about an axis transverse to the plane of the vehicle support and movement means;
  a reciprocal carriage to which said brush is mounted;
  suspension and guide means transversely oriented relative to said vehicle support and movement means for supporting said carriage; and
  a flexible line secured to said carriage and having at least a portion thereof extending toward the vehicle support and movement means;
  a weight means carried by said line to urge the carriage toward the vehicle support and movement means;

References Cited
UNITED STATES PATENTS 3,011,501 12/1961 Beranek _____ 134—123 X

FOREIGN PATENTS 799,810 8/1958 Great Britain.

EDWARD L. ROBERTS, *Primary Examiner.*